US011128649B1

(12) United States Patent
Yeh et al.

(10) Patent No.: US 11,128,649 B1
(45) Date of Patent: Sep. 21, 2021

(54) SYSTEMS AND METHODS FOR DETECTING AND RESPONDING TO ANOMALOUS MESSAGING AND COMPROMISED ACCOUNTS

(71) Applicant: Trend Micro Incorporated, Tokyo (JP)

(72) Inventors: Che-Fu Yeh, Taipei (TW); Cheng Hsin Hsu, Taipei (TW); Pei-Yin Wu, Taipei (TW); Ming-Hung Chen, Taipei (TW); Peng-Shih Pu, Taipei (TW); Rung Chi Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 205 days.

(21) Appl. No.: 16/294,248

(22) Filed: Mar. 6, 2019

(51) Int. Cl.
*H04L 29/06* (2006.01)

(52) U.S. Cl.
CPC ...... *H04L 63/1425* (2013.01); *H04L 63/1433* (2013.01); *H04L 63/1441* (2013.01); *H04L 2463/082* (2013.01)

(58) Field of Classification Search
CPC ............. H04L 63/1425; H04L 63/1433; H04L 63/1441; H04L 2463/082
See application file for complete search history.

(56) References Cited

U.S. PATENT DOCUMENTS

| | | | | |
|---|---|---|---|---|
| 8,601,064 B1* | 12/2013 | Liao | ........................ | H04L 51/12 709/206 |
| 8,938,508 B1* | 1/2015 | McCorkendale | .... | G06Q 10/107 709/206 |
| 9,537,880 B1* | 1/2017 | Jones | .................... | G06F 21/554 |
| 9,979,742 B2* | 5/2018 | Mumcuoglu | ......... | G06F 21/552 |
| 10,044,745 B1 | 8/2018 | Jones et al. | | |
| 10,129,282 B2 | 11/2018 | Jones et al. | | |
| 2010/0241535 A1* | 9/2010 | Nightengale | .......... | G06Q 20/40 705/30 |
| 2015/0081701 A1* | 3/2015 | Lerios | ................... | H04L 43/045 707/736 |
| 2017/0026398 A1* | 1/2017 | Mumcuoglu | ......... | G06F 21/566 |
| 2017/0230323 A1 | 8/2017 | Jakobsson | | |
| 2018/0046475 A1 | 2/2018 | Wei et al. | | |
| 2018/0096157 A1 | 4/2018 | Israel et al. | | |
| 2019/0132224 A1* | 5/2019 | Verma | ................. | H04L 47/2441 |
| 2019/0260777 A1* | 8/2019 | Mehrotra | ............ | H04L 63/1433 |

FOREIGN PATENT DOCUMENTS

WO    WO-2010129342 A2 * 11/2010 ......... G06Q 30/0185

* cited by examiner

*Primary Examiner* — Meng Li
(74) *Attorney, Agent, or Firm* — Patrick D. Benedicto

(57) ABSTRACT

One embodiment disclosed relates to a system for detecting anomalous messaging, discovering compromised accounts, and generating responses to threatened attacks. The system utilizes API commands and log forwarding for interaction and communication between a messaging and account hunting platform, other hunting platforms, an action center, and a security operations center. Another embodiment relates to a method of, and system for, performing a complete root cause analysis. Another embodiment relates to a method of, and system for, anomaly discovery which may advantageously utilize reference data to correlate different anomalies for reporting as a single incident.

19 Claims, 9 Drawing Sheets

RCA Scan

[Input]
- Suspicious object
  - File SHA1, Filename
  - URL, Domain
  - Account name
- Email meta
  - Subject
  - Content keywords
  - Display name in "From"
- Time period

[Output]
- RCA report
  - Emails with search inputs
  - Timestamps
  - Accounts sent/received the emails
  - Relationship between emails and accounts in the report
- Impact scope
  - Other accounts who received/sent emails similar to those in RCA report (*Relationship Trigger*)
  - AD activities and propagation scope (*Activity Trigger*)
  - Suspicious objects

Search by Account

[Input]
- Account
- Time period
- Filtering criteria

[Output]
- Emails (and their meta) sent/received by the account
- Trigger info
  - Triggered triggers of the account and each email
- Suspicious object
  - Attachment name/sha1
  - Embedded URL
- Smart alert
  - Alerts the account/email involves
- Already Compromised? info or hint

SYSTEMS AND METHODS FOR DETECTING AND RESPONDING TO ANOMALOUS MESSAGING AND COMPROMISED ACCOUNTS

BACKGROUND OF THE INVENTION

1. Field of the Invention

The present disclosure relates generally to computer and data network security. More particularly, the present disclosure relates to, but is not limited to, electronic mail ("email") security.

2. Description of the Background Art

Email has become a relatively common means of communication among individuals. Among its advantages, email is relatively convenient, fast, and cost-effective compared to traditional mail.

Unfortunately, the features that make email popular also lead to its abuse. For example, some parties have resorted to mass emailings of advertisements or other unsolicited email over the Internet. These mass emails, which are also referred to as "spam emails" or simply "spam," are sent to computer users regardless of whether they asked for them or not.

Besides spam, other malicious attacks relating to email are of serious concern in relation to email security. For example, email account compromised (EAC) related attacks may originate in a malware infection which, unknowing to the user, compromises the user's email account. The EAC related attack may then utilize the compromised email account to further perform or propagate the attack.

SUMMARY

One embodiment disclosed relates to a system for detecting anomalous messaging, discovering compromised accounts, and generating responses to threatened attacks. The system utilizes API commands and log forwarding for interaction and communication between a messaging and account hunting platform, other hunting platforms, an action center, and a security operations center. Another embodiment relates to a method of, and system for, performing a complete root cause analysis. Another embodiment relates to a method of, and system for, anomaly discovery which may advantageously utilize reference data to correlate different anomalies for reporting as a single incident.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 4 depicts inputs and outputs of an exemplary implementation of a root cause analysis (RCA) scan task in accordance with an embodiment of the invention.

FIG. 6 depicts inputs and outputs of an exemplary implementation of a search by account task in accordance with an embodiment of the invention.

The use of the same reference label in different drawings indicates the same or like components.

DETAILED DESCRIPTION

Current email security solutions generally aim to prevent an external attack from getting through to its defenses. These defenses typically include scanning for malicious signatures. They may also include utilization of reputational data for IP (internet protocol) addresses and analysis of the behavior of the email sender. However, as disclosed herein, these defenses are not particularly effective on attacks that originate internally from an existing malware infection, such as, for example, EAC related attacks.

The presently-disclosed solution advantageously improves email security in the event that the attack originates from within the protected network. For example, the attack may come from a user account of the protected network, where the user account is compromised due to a prior malware infection. The presently-disclosed solution has capability to detect and respond to abnormal behavior or unusual events pertaining to email messaging and account activities when such a legitimate user account has been so compromised. Furthermore, the presently-disclosed solution not only improves email security in the event that the attack originates from within the protected network (attacks that originate internally from EAC), but it also improves email security in the event that sophisticated phishing techniques are used in emails originating externally from attackers directly or EAC in other companies.

In an exemplary implementation, the presently-disclosed solution may use machine learning to perform anomaly detection using a baseline. The baseline may be established through continuous learning of normal and abnormal behaviors. The intelligence from machine learning provides a clearer view of the scope of impact of the attack and so enables a more effective response to the attack. Advantageously, the presently-disclosed solution improves the timeliness and effectiveness of protection against such attacks. Furthermore, the presently-disclosed solution provides a security operations center with insight into their organization's behavior.

Computer

Figure 1:
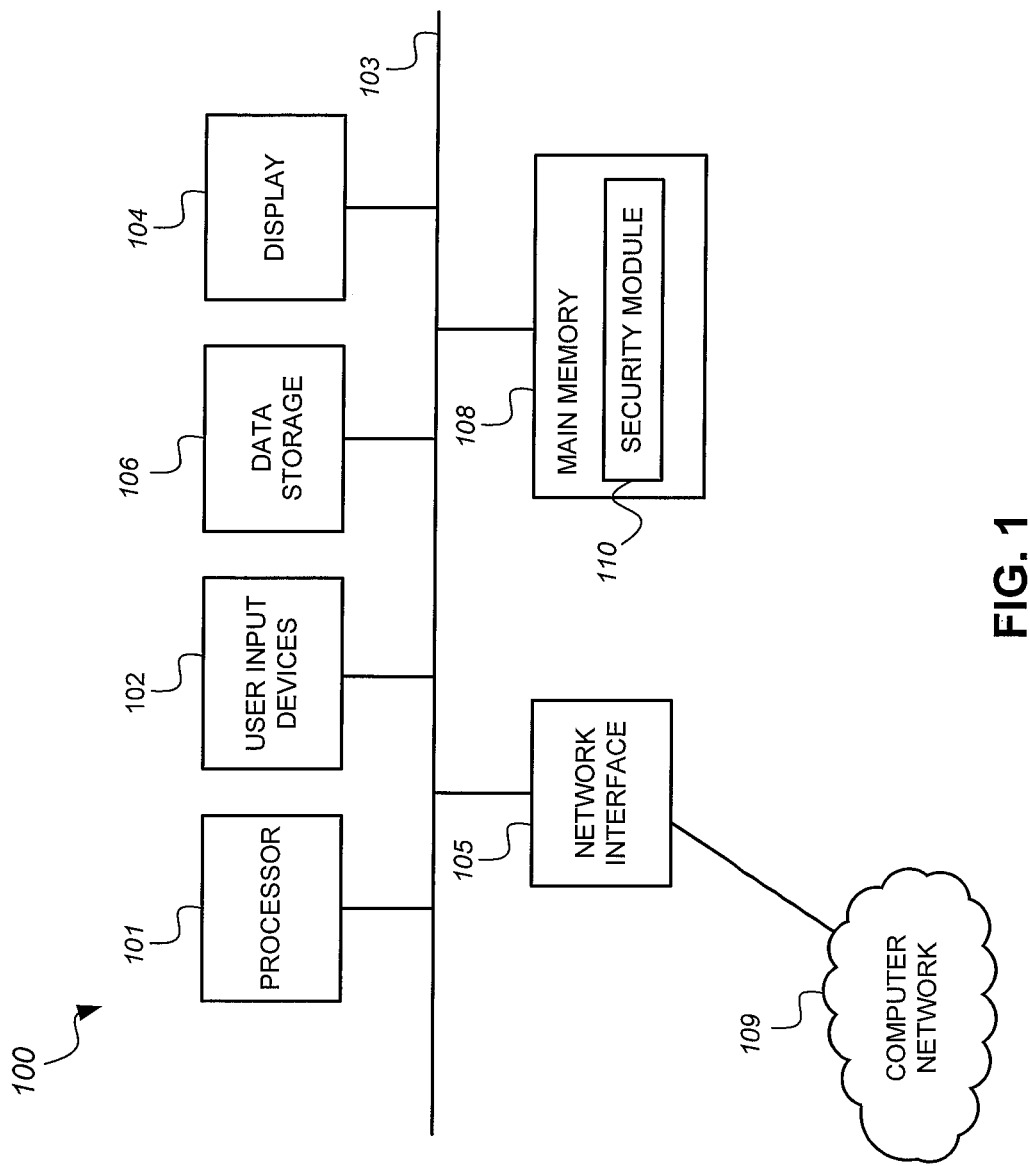
FIG. 1 is a logical diagram of a computer system in accordance with an embodiment of the present invention.

Referring now to FIG. 1, there is shown a logical diagram of a computer system 100 in accordance with an embodiment of the present invention. The computer system 100 may be employed as a network security device, a client device, or a cloud security system, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

In the example of FIG. 1, the software modules comprise components of a security module 110, for example. Such a security module 110 may be configured to inspect network traffic or to otherwise process data. As can be appreciated, the security modules 110 may also be implemented in hardware (e.g., application-specific integrated circuit, field-programmable gate array, programmable logic device) or a combination of hardware and software depending on the particulars of the implementation.

Figure 2:
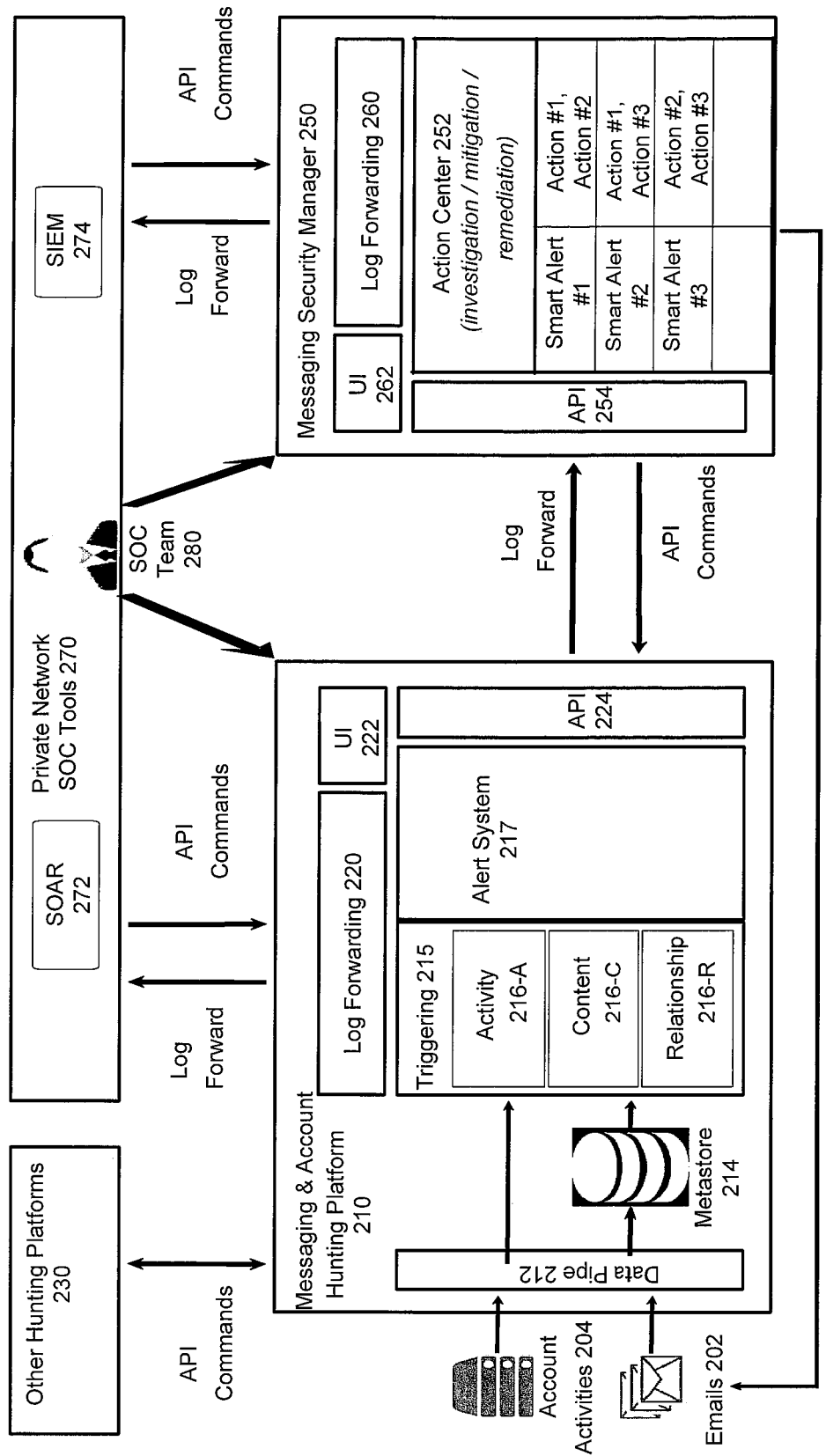
FIG. 2 is a diagram of a system for detecting anomalous messaging, discovering compromised accounts, and generating responses to threatened attacks in accordance with an embodiment of the present invention.
Figure 8:
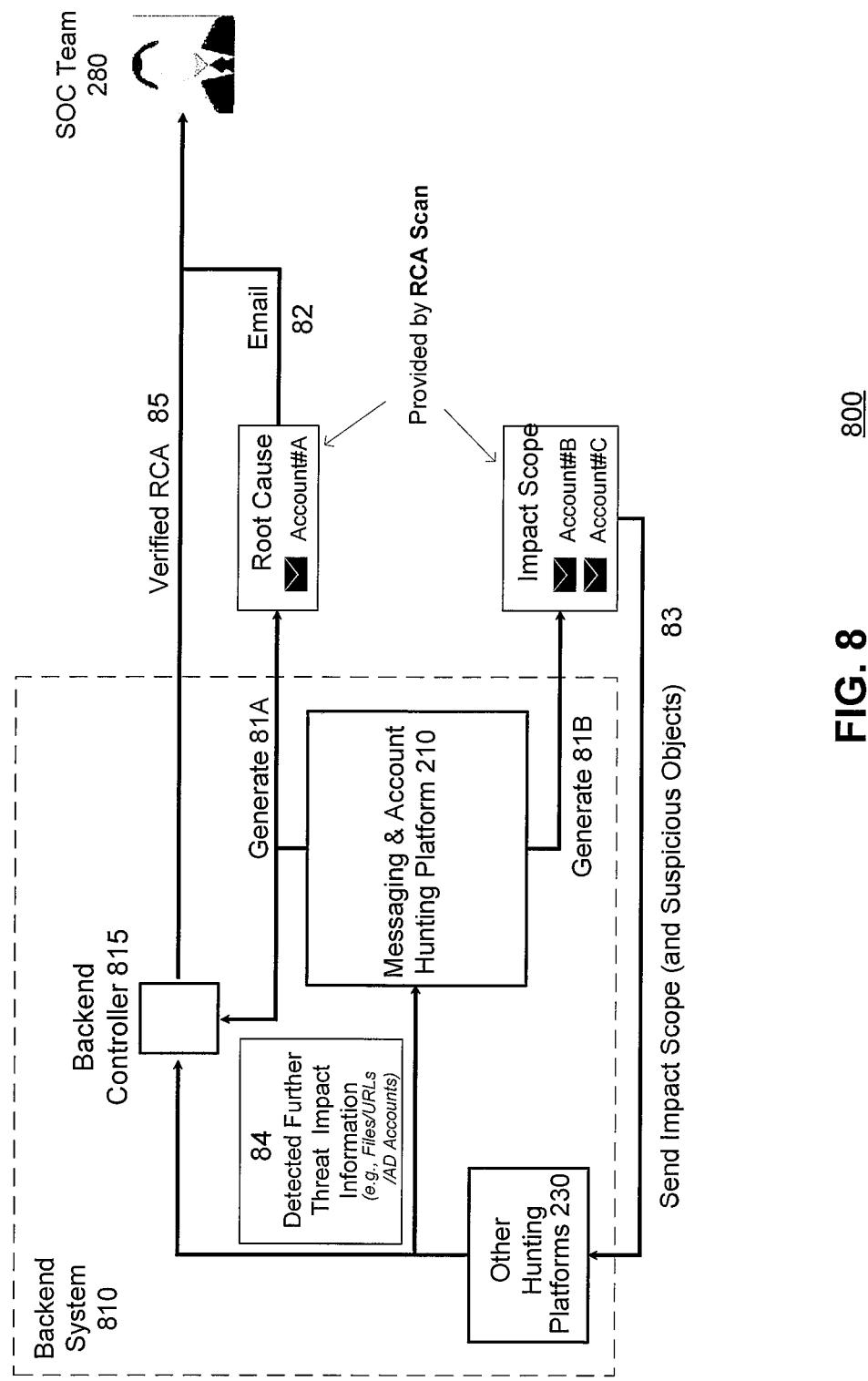
FIG. 8 depicts a method of, and system for, performing a complete root cause analysis (RCA) in accordance with an embodiment of the present invention.
Figure 9:
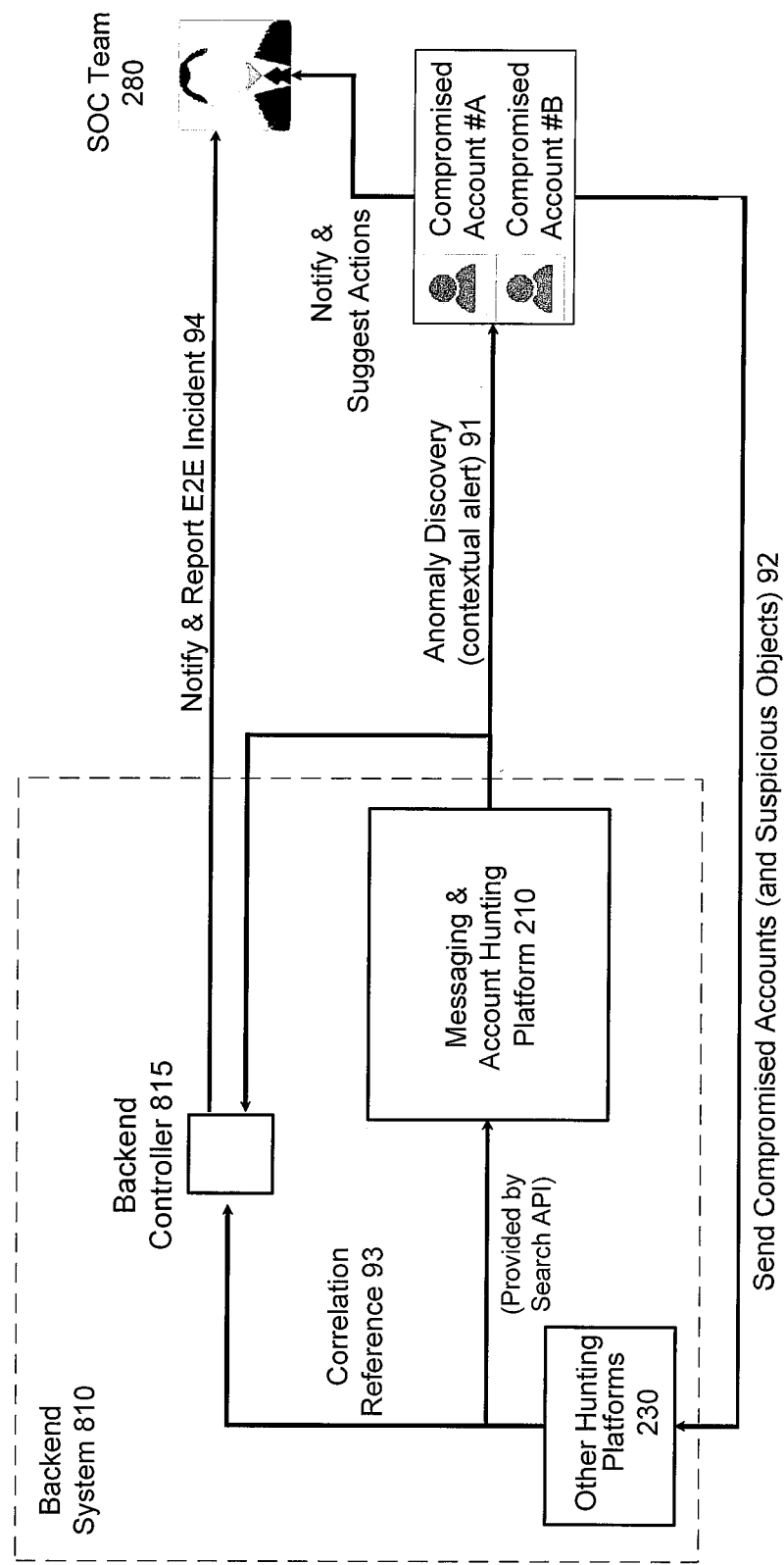
FIG. 9 depicts a method of, and system for, correlating anomaly discoveries in accordance with an embodiment of the present invention.

Such a computer system 100 may be used to implement various devices and apparatus in the systems depicted in FIGS. 2, 8 and 9 and described herein. The implemented devices and apparatus include, for example, those referred to as platforms, systems, analyzers, centers and controllers.

System for Threat Hunting and Response

FIG. 2 is a diagram of a system 200 for detecting anomalous messaging, discovering compromised accounts, and generating responses to threatened attacks in accordance with an embodiment of the present invention. As shown, the system 200 includes multiple interacting components: a messaging and account hunting platform 210, other hunting platforms 230, an action center 252, and private network security operations center (SOC) tools 270. The private network SOC tools 270 may include a security orchestration, automation, and response (SOAR) system 272 and a security information and event management (SIEM) system 274.

The messaging and account hunting platform 210 may receive email messages 202 and account activities data 204 via a data pipe 212. The data pipe 212 may pass the messages 202 and account activities 204 data to the triggering system 215. The data pipe 212 may also store metadata from the email messages 202 and account activities data 204 in metastore (data storage for metadata) 214. The messaging and account hunting platform 210 may further include a log forwarding module 220, a user interface (UI) 222 to control and monitoring purposes, and an application programming interface (API) 224 for communicating API commands.

The triggering system 215 may apply three different types of triggers: activity triggers 216-A, content triggers 216-C, and relationship triggers 216-R. Each trigger may comprise a machine learning (ML) model which is trained by a machine learning process. Exemplary implementations of activity, content and relationship triggers are described below in relation to Tables 1, 2 and 3, respectively.

The output of the triggering system 215 (i.e. the "activated" triggers due to satisfaction of triggering conditions) may be provided to the alert system 217. Each time a trigger is so activated, information about the activated trigger may be sent without delay to the alert system 217.

The alert system 217 may apply trigger-based rules that determine the issuance of contextual alerts. The contextual alerts may be targeted at different stages of an attack and/or at different types of attack. Exemplary contextual alerts which may be generated are described below in relation to Table 4.

The messaging security manager 250 may include an action center 252 that receives the alert output (i.e. information about the issued contextual alerts) from the alert system 217 of the messaging and account hunting platform 210 (for example, via the log forwarding shown in FIG. 2). The action center 252 may be implemented using a cloud service or an on-premises appliance or server. The action center 252 uses the received contextual alerts to determine responsive actions. More particularly, each contextual alert may have a corresponding set of actions relating to investigation, mitigation, and/or remediation of a perceived threat. Alternatively, or in addition, to the action center 252 generating, responsive actions corresponding to the contextual alerts may be generated by the security operations center responsive actions corresponding to the contextual alerts (SOC) tools 270. In other words, the messaging security manager 250 and/or the SOC tools 270 may include an action generator for generating responsive actions corresponding to the contextual alerts.

In an exemplary implementation, the actions may be communicated or initiated by way of API commands. Exemplary API commands, including those for searching, mitigation and remediation tasks, are described below in relation to FIG. 3. In addition, a user interface (UI) 262 of the messaging security manager 250 may be used to control and/or monitor the action center 252.

Activity Triggers

The activity triggers 216-A generally utilize account activity related data sources, such as message logs and active directory logs, as data input sources. In an exemplary implementation, a local normal behavioral statistical model may be trained and utilized for each private network being protected. In addition, a global normal behavioral statistical model may be trained and utilized across multiple private networks being protected. The activity triggers 216-A may be utilized to detect attacks which are relatively straightforward.

Exemplary activity triggers 216-A are shown in Table 1, for example. The activity triggers have arbitrary labels beginning with "A". Other activity triggers 216-A in addition to those in Table 1 may also be implemented.

TABLE 1

Exemplary Activity Triggers

| Label | Relevant Data | Triggering Condition(s) |
| --- | --- | --- |
| A1 | "From" header; Received timestamp | Global consensus: The "From" domain is new in past N days |
| A2 | Normalized embedded URL; Received timestamp | Global consensus: The embedded URL/domain in email body is new/low prevalence/identified as malicious by web reputation service |

TABLE 1-continued

Exemplary Activity Triggers

| Label | Relevant Data | Triggering Condition(s) |
|---|---|---|
| A3 | Basic active directory information (Active directory account, Client IP address, Event timestamp); AD event code of using hacking tool; Machine name | An account has activity traces indicating the usage of hacking tools. |
| A4 | Email subject; Email body (structural metadata); Normalized embedded URL; Received timestamp; Recipient domain | Global consensus: In the last N minutes, similar emails were received by multiple accounts in the private network. |
| A5 | Sender account; Sent timestamp | An account sent lots of emails in the last N minutes. |
| A6 | Logon timestamp; Logon IP address and its geolocation | An account has logon activities coming from multiple geolocations in a short period of time. |
| A7 | Logon timestamp; Logon IP address and its geolocation | An account has logon activities coming from a new geolocation. |
| A8 | "BCC" field in header; Metadata which identifies content forwarding | BCC method is used to forward emails out. |

The activity trigger A1 uses the "from" header and the received timestamp of the email message. Using this information, the activity trigger A1 is triggered when the "From" domain is new in past N days (where N is a number which may be set). This determination is made under a global consensus in that information from various private networks may be used to make the determination.

The activity trigger A2 uses an embedded URL within the email message and the received timestamp of the email message. The embedded URL may be normalized before being used. Using this information, the activity trigger A2 is triggered when the embedded URL (or the domain of the embedded URL) in is new or low prevalence or found in a web reputation service database. This determination is made under a global consensus in that information from various private networks may be used to make the determination.

The activity trigger A3 uses basic active directory (AD) information, one or more AD event codes of using a hacking tool, and the machine name. Using this information, the activity trigger A3 is triggered when an account has activity traces indicating the usage of hacking tools.

The activity trigger A4 uses the email subject, email body (structural metadata), an embedded URL, the received timestamp, and the recipient domain. The embedded URL may be normalized before being used. Using this information, the activity trigger A4 is triggered when in the last N minutes (where N is a number which may be set), similar emails have been received by multiple accounts in the private network.

The activity trigger A5 uses the sender account and the sent timestamp. Using this information, the activity trigger A5 is triggered when an account has sent a lot of email messages in the last N minutes (where N is a number which may be set).

The activity trigger A6 uses the logon timestamp and the logon IP address and its geolocation. Using this information, the activity trigger A6 is triggered when an account has logon activities coming from multiple geolocations is a short period of time.

The activity trigger A7 also uses the logon timestamp and the logon IP address and its geolocation. Using this information, the activity trigger A7 is triggered when an account has logon activities coming from a new geolocation.

The activity trigger A8 uses the BCC field in the email header and metadata which identifies content forwarding. Using this information, the activity trigger A8 is triggered when an email forwards content using the BCC method.

Content Triggers

The content triggers 216-C generally utilize message content as a data input source. In an exemplary implementation, user-style patterns may be generated and utilized for select accounts (i.e. for accounts deemed important) for each private network being protected. The content triggers 216-C may be utilized to protect the attacks of business email compromise (BEC) and targeted phishing (spear-phishing) attacks. In addition, the content triggers 216-C may also be utilized as a part of the triggers whose combination can help identify email account compromised (EAC) attacks.

Exemplary content triggers 216-C are shown in Table 2, for example. The content triggers shown have arbitrary labels beginning with "C". Other content triggers 216-C in addition to those in Table 2 may also be implemented. Although not always listed in Table 2, the relevant data for the content triggers 216-C generally includes some content of the message body and/or its attachments, if any.

TABLE 2

Exemplary Content Triggers

| # | Relevant Data | Triggering Condition(s) |
|---|---|---|
| C1 | Potential phishing keywords | Embedded URL in body of message contains phishing keyword(s). |
| C2 | Intention keywords | Embedded URL in body of message contains intention keyword(s). |

TABLE 2-continued

Exemplary Content Triggers

| # | Relevant Data | Triggering Condition(s) |
|---|---|---|
| C3 | Hash of HTML tag structure of body of message; Hash of targeted phishing template; "From" domain | Phishing template similarity 1) The HTML structure of email body is similar to known phishing template; 2) The "From" account belongs to a famous website. |
| C4 | Sender account; Email attachment; Sent timestamp | The sent emails in a predetermined period of time contains local host information (for example, hosts or password file in Linux). |
| C5 | Sender account; Metadata on the writing style of the email content from the sender account | An account sent an email that does not match the account's writing style. |
| C6 | Sender account; Email subject; Metadata on the topics and/or intentions of the email content from the sender account | An account sent emails with new topics/intentions. |
| C7 | Sender account; Sent timestannp | An account sent emails at a time which the account never sent emails before. |
| C8 | Sender account; Email subject; Metadata on the writing style of the email content from the sender account; BEC/phishing writing style | An account sent an email with a writing style similar to BEC or phishing emails. |

The content trigger C1 uses predetermined potential phishing keywords (in addition to content in the message body). Using this information, the content trigger C1 is triggered when an embedded URL in the body of the message contains one or more of the phishing keywords.

The content trigger C2 uses predetermined intention keywords. Using this information, the content trigger C2 is triggered when an embedded URL in the body of the message contains one or more of the intention keywords.

The content trigger C3 uses a hash of the HTML tag structure of the email body, a hash of a targeted phishing template, and the domain of the "From" address of the message. Using this information, the content trigger C3 is triggered to indicate similarity with a phishing template when the HTML tag structure of the email body is similar to the known phishing template and the "From" address belongs to a well-known (famous) website (for example, that of a large financial, government or commercial institution).

The content trigger C4 uses the sender account, the email attachment and the sent timestamp. Using this information, the content trigger C4 is triggered when the sent emails in a predetermined period of time contains local host information (for example, hosts or a password file in Linux).

The content trigger C5 uses the sender account and metadata on the writing style of the email content from the sender account. Using this information, the content trigger C5 is triggered when an account sent an email that does not match the account's writing style.

The content trigger C6 uses the sender account and metadata on the topics and/or intentions of the email content from the sender account. Using this information, the content trigger C6 is triggered when an account sent an email with new topics and/or intentions.

The content trigger C7 uses the sender account and the sent timestamp. Using this information, the content trigger C6 is triggered when an account sent emails at a time at which the account never sent emails before.

The content trigger C8 uses the sender account, the email subject, metadata on the writing style of the email content from the sender account, and writing style data of BEC and/or phishing emails. Using this information, the content trigger C8 is triggered when an account sent an email with a writing style similar to that of the BEC or phishing emails.

Relationship Triggers

The relationship triggers 216-R generally utilize the sender and recipient accounts of a message as data input sources. In an exemplary implementation, unique relationship triggers may be generated for each private network being protected. The relationship triggers 216-R may be utilized to detect abnormal connected behaviors when new relationships are built.

Exemplary relationship triggers 216-R are shown in Table 3, for example. The relationship triggers shown have identifying labels beginning with "R". Other relationship triggers 216-R may also be implemented.

TABLE 3

Exemplary Relationship Triggers

| # | Relevant Data | Triggering Condition(s) |
|---|---|---|
| R1 | Sender account; Recipient account; Filetype of attachment; Sent/received timestamp | The attachment file type is new to the recipient (or new to the protected private network) in the past N days. |
| R2 | Sender account; Recipient account; Is_external; Sent/received timestamp | The external recipient is too far away from the sender account. |
| R3 | Sender account; Receiver account; Is_external; Sent/received timestamp | The internal recipient is too far away from the sender account. |

The relationship trigger R1 uses the sender account, the recipient account, the file type of an attachment to the message, and the sent and received timestamps. Using this information, the relationship trigger R1 is triggered when the attachment file type is new to the recipient (or new to the private network of the recipient) in the past N days, where N is a predetermined number of days.

The relationship trigger R2 uses the sender account, the recipient account, a flag indicating whether the message travels external to the private network, and the sent and received timestamps. Using this information, the relationship trigger R2 is triggered when the distance to an external recipient from an internal sender exceeds a predetermined threshold (i.e. when the external recipient is too far away from the sender account).

Similarly, the relationship trigger R3 uses the sender account, the recipient account, a flag indicating whether the message travels external to the private network, and the sent and received timestamps. Using this information, the relationship trigger R3 is triggered when the distance to an internal recipient from an external sender exceeds a predetermined threshold (i.e. when the internal recipient is too far away from the sender account).

Contextual Alerts

The alert system 217 generates contextual alerts ("smart alerts" in FIG. 2) depending on the messaging and account triggers received. In an exemplary implementation, the contextual alerts may be targeted at different stages of an attack and/or at different types of attack. The different stages of an attack may include, for example, a "cast the net" stage to search for target accounts to attack and an information stealing stage during which the attack is being performed via a compromised account. The different attack types may include, for example, an email account compromised (EAC) type of attack or an active directory (AD) type of attack.

Exemplary contextual alerts are shown in Table 4, for example. The contextual alerts shown have identifying labels beginning with "CA". Other contextual alerts may also be implemented.

The contextual alert CA1 relates to the "cast the net" stage of an attack. The combination of triggers which activates CA1 includes activity triggers A1, A2 and A4 and either content trigger C1 or C2. The contextual alert CA1 indicates that, in a short period of time, many accounts in the same private network received similar emails which contain new "From" domains and the URLs embedded in the email body are new/low-prevalence and contain typical phishing/intention keywords.

The contextual alert CA2 also relates to the "cast the net" stage of an attack. The combination of triggers which activates CA2 includes R1, and either R2 or R3, and either A1 or A2. The contextual alert CA2 indicates that an account received an email with either an attachment whose filetype has not been seen before, and the sender has a far relationship to the recipient, and either the "From" domain is new or an embedded URL or domain in the email body is new or low prevalence or identified as malicious by a web reputation service.

The contextual alert CA3 relates to the information stealing stage of an attack. The combination of triggers which activates CA3 includes either A5 or A8, and any one (or more) of A6, A7, C4, R2, and R3. The contextual alert CA3 indicates that an account sent out a large number of emails or sent out emails using the BCC method. In addition, the account logs in from multiple geolocations in a short period of time, or logs in from a new geolocation, or sends out emails with local host information, or sends out emails to a recipient that has a very distant relationship to the account.

TABLE 4

Exemplary Contextual Alerts

| # | Rule | Alert Summary |
|---|---|---|
| CA1 | A1 and A2 and A4 and (C1 or C2) | In a short period of time, many accounts in the same private network received similar emails which contain new "From" domains and the URLs embedded in the email body are new/low-prevalence and contain typical phishing/intention keywords. |
| CA2 | R1 and (R2 or R3) and (A1 or A2) | An account received an email with either an attachment whose filetype has not been seen before, and the sender has a far relationship to the recipient, and either the "From" domain is new or an embedded URL or domain in the email body is new or low prevalence or identified as malicious by a web reputation service. |
| CA3 | (A5 or A8) and (A6 or A7 or C4 or R2 or R3) | An account sends out a large number of emails or sends out emails using BCC method. In addition, the account logs in from multiple geolocations in a short period of time, or logs in from a new geolocation, or sends out emails with local host information, or sends out emails to a recipient that has a very distant relationship to the account. |
| CA4 | Any 2 of (C5, C6, C7 and C8) | An account sends an email with any two or more of these characteristics: C5) does not match writing style of the account; C6) has new topics/intentions; C7) was sent at a time at which account never sent emails before; and C8) has writing style similar to that of BEC or phishing emails. |
| CA5 | A7 and (C5 or C6 or C7 or C8) | An account has A7) logon activities coming from a new geolocation and has one or more of these characteristics: C5) does not match writing style of the account; C6) has new topics/intentions; C7) was sent at a time at which account never sent emails before; and C8) has writing style similar to that of BEC or phishing emails. |
| CA6 | A3 | An account has activity traces indicating the usage of one or more hacking tools. |
| CA7 | Any A and Any C and Any R | An alert is triggered once at least one indicator is triggered in all 3 types (even if the combination of triggers does not match any of the other rules). |

The contextual alert CA4 relates to the detection of a potential email account compromised (EAC) type of attack. The combination of triggers which activates CA4 includes any two (or more) of C5, C6, C7 and C8.

The contextual alert CA5 also relates to the detection of a potential EAC type of attack. The combination of triggers which activates CA5 includes A7 and any one (or more) of C5, C6, C7 and C8.

The contextual alert CA6 relates to the detection of a potential active directory (AD) type of attack. The A3 trigger activates CA6.

The contextual alert CA7 relates to multiple attack stages. The combination of triggers which activates CA7 includes any activity (A) trigger and any content (C) trigger and any relationship (R) trigger.

API Commands

Figure 3:
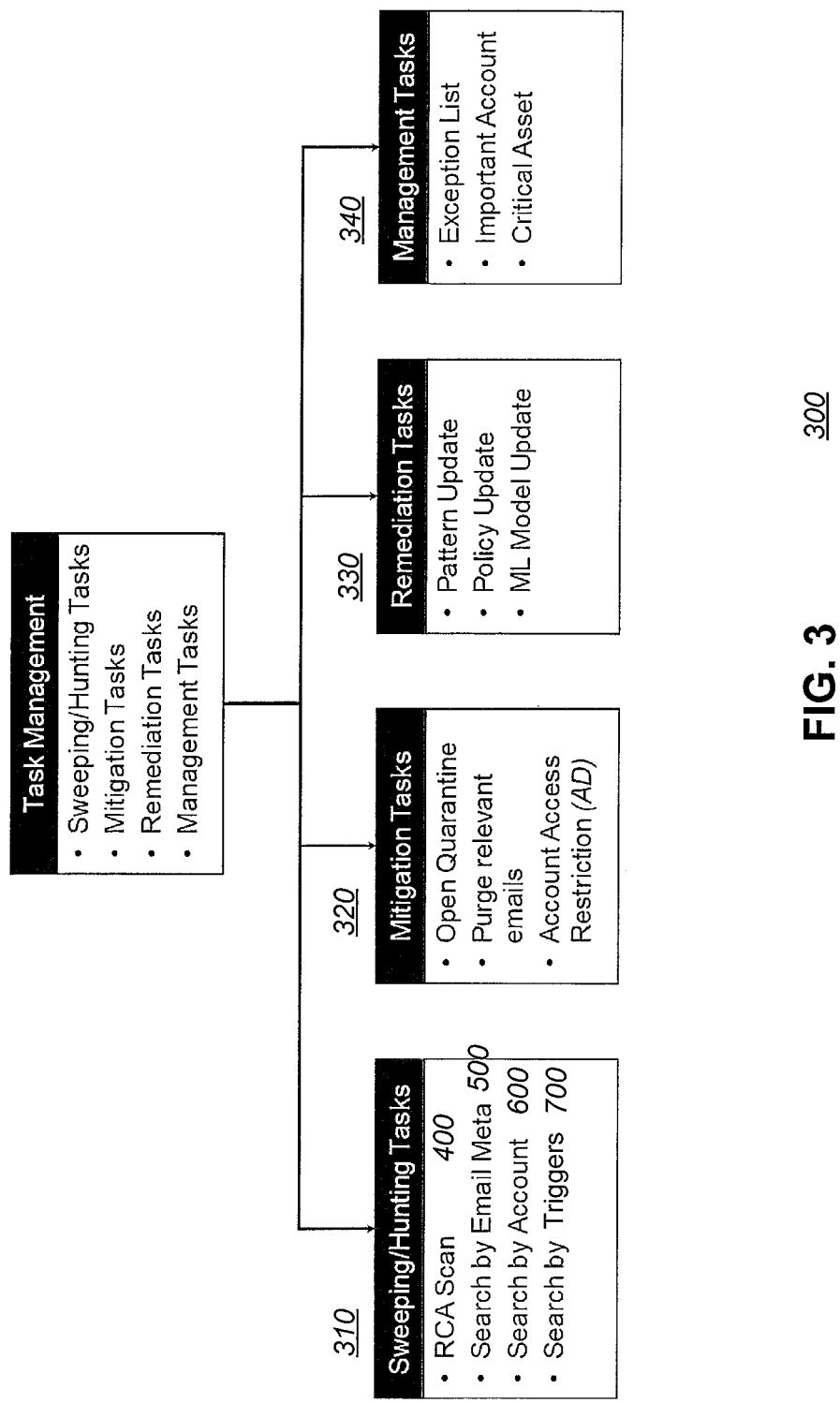
FIG. 3 is a diagram showing exemplary application programming interface (API) commands which may be communicated between components in the system in accordance with an embodiment of the present invention.

FIG. 3 is a diagram showing exemplary application programming interface (API) commands 300 which may be communicated between components in the system in accordance with an embodiment of the present invention. For example, the messaging security manager 250 may utilize such API commands to communicate and initiate actions which are responsive to contextual alerts. As shown, the API commands 300 may perform the following types of tasks: sweeping/hunting tasks 310; mitigation tasks 320; remediation tasks 330; and management tasks 340.

As shown, the sweeping/hunting tasks 310 may include: RCA (root cause analysis) scan 400; search by electronic mail metadata 500; search by account 600; and search by triggers 700. The mitigation tasks 320 may include: open quarantine; purge relevant emails; and account access restriction. The remediation tasks 330 may include: pattern update; policy update; and machine learning (ML) model update. Finally, the management tasks 340 may include: exception list management; important account management; and critical asset management.

FIG. 4 depicts inputs and outputs of an exemplary implementation of an RCA scan 400 task in accordance with an embodiment of the invention. As shown, the inputs of the RCA scan may include data relating to the suspicious object, relevant electronic mail message metadata, and a relevant time period. The suspicious object data may comprise, for example, a secure hash of the file (File SHA1, for instance), a file name, a URL, a domain, and/or an account name. The email metadata may comprise, for example, the subject, content keywords, and a display name in the "From" field.

The outputs of the RCA scan may comprise, for example, an RCA report and an impact scope. The RCA report may include, for example, emails which match the search inputs, timestamps of those emails, accounts which sent or received the emails, and the relationship between the emails and accounts in the report. The impact scope may include other accounts which received or sent emails similar to those in the RCA report (as determined using relationship triggers) and AD activities and propagation scope (as determined using activity triggers). The impact scope may also include suspicious objects.

Figure 5:
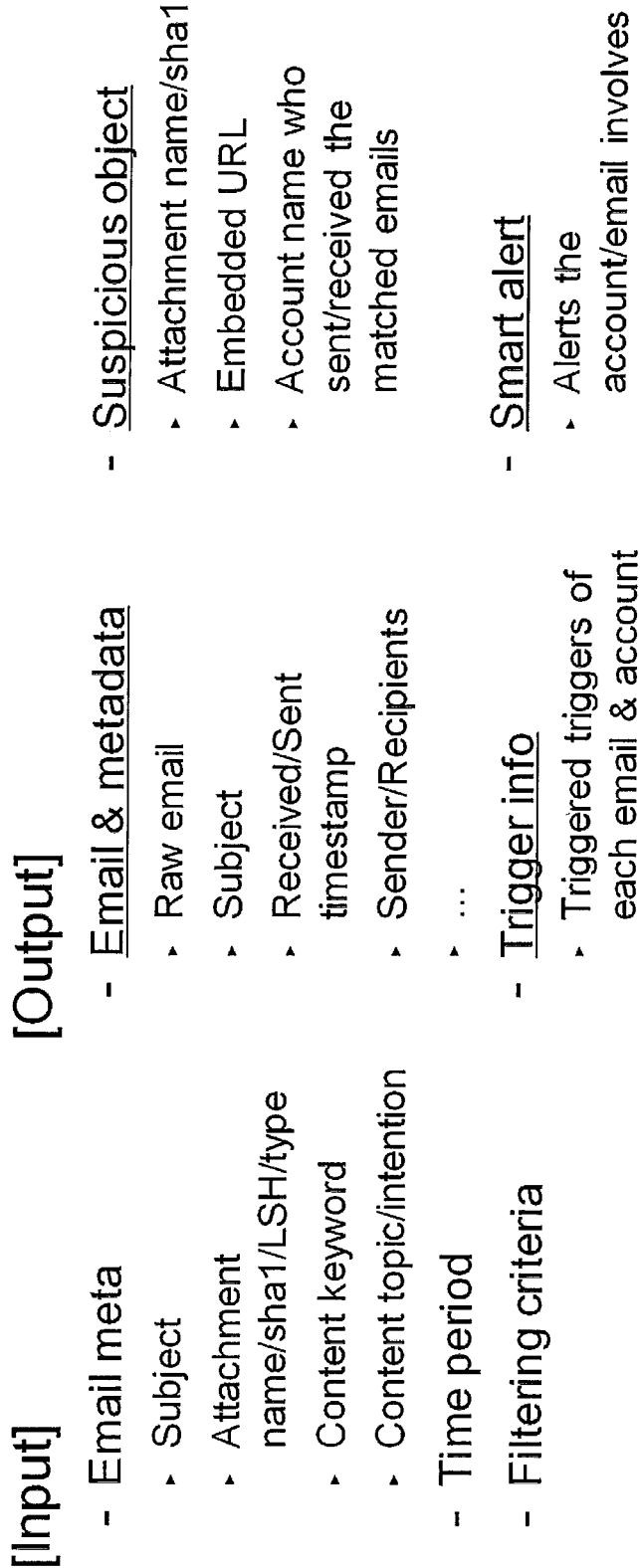
FIG. 5 depicts inputs and outputs of an exemplary implementation of a search by electronic mail metadata task in accordance with an embodiment of the invention.

FIG. 5 depicts inputs and outputs of an exemplary implementation of a search by electronic mail metadata 500 task in accordance with an embodiment of the invention. As shown, the inputs of the search by email metadata may include email message metadata, a time period, and filtering criteria for the search. The email metadata may include, for example: the subject; data relating to an attachment, such as its name, secure hash value (sha1), locality sensitive hash (LSH), and type; a keyword in the content, and a topic or intention of the content.

The outputs of the search by email metadata may comprise, for example, matched emails and their metadata, trigger information, data relating to any suspicious object in the matched emails, and contextual (smart or intelligent) alerts. The relevant emails and their metadata may include, for example, the raw email messages, their subjects, their received and sent timestamps, and the senders and recipients. The trigger information may include, for example, the triggered triggers of each email and account. The suspicious object data may include, for example, the name and secure hash of an attachment, an embedded URL, or a name of an account which sent or received the matched emails. The contextual (smart or intelligent) alerts may include those alerts which involve the matched emails or related accounts.

FIG. 6 depicts inputs and outputs of an exemplary implementation of a search by account 600 task in accordance with an embodiment of the invention. As shown, the inputs of the search by account may include account information, a time period, and filtering criteria for the search.

The outputs of the search by account may comprise, for example, relevant emails (and their metadata) which were sent or received by the matched account(s), trigger information, data relating to any suspicious object in the emails, contextual (smart or intelligent) alerts, and information (or a hint) as to whether or not the account is already compromised. The trigger information may include, for example, the triggered triggers of the matched accounts and each of the relevant emails. The suspicious object data may include, for example, the name and secure hash of an attachment or an embedded URL from the relevant emails. The contextual (smart or intelligent) alerts may include those alerts which involve the matched account(s) or relevant emails.

Figure 7:
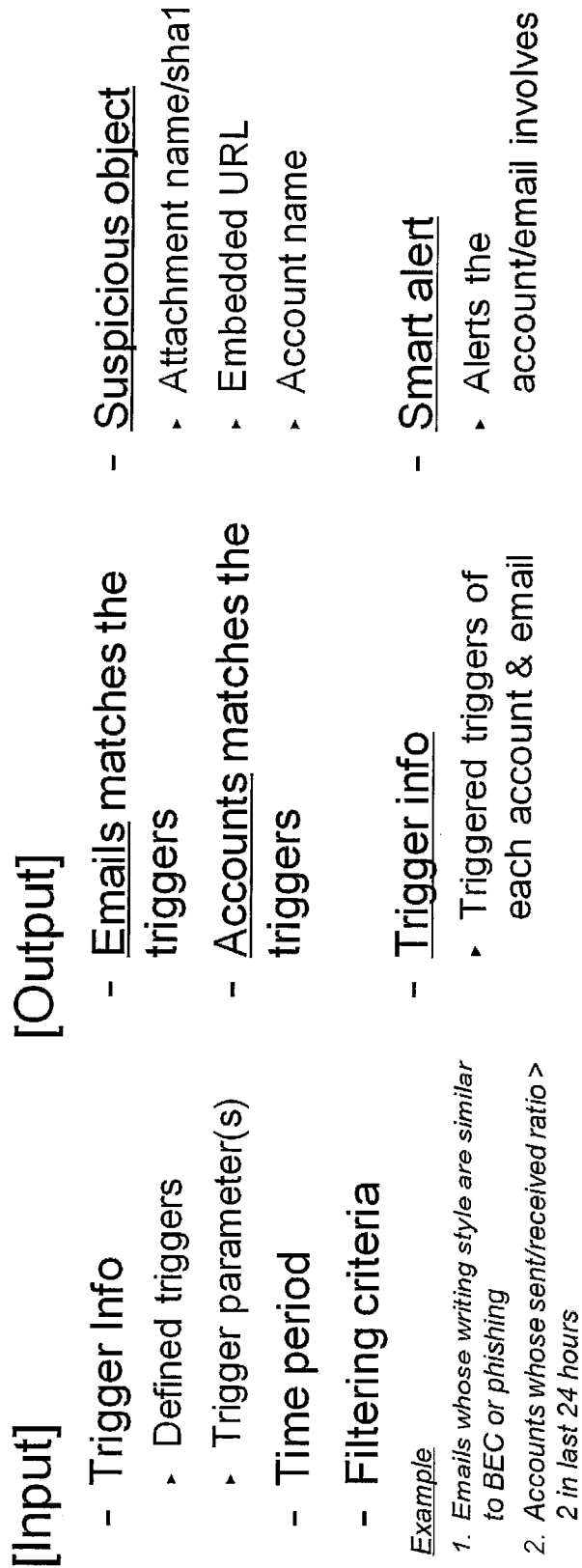
FIG. 7 depicts inputs and outputs of an exemplary implementation of a search by trigger task in accordance with an embodiment of the invention.

FIG. 7 depicts inputs and outputs of an exemplary implementation of a search by trigger 700 task in accordance with an embodiment of the invention. As shown, the inputs of the search by trigger may include trigger information, a time period, and filtering criteria for the search. The trigger information may include defined triggers and one or more trigger parameter(s). As one example, the search may be for emails which have writing style that is similar to BEC or phishing emails. As another example, the search may be for accounts whose sent/received ratio is greater than 2 in the last 24 hours.

The outputs of the search by trigger may comprise, for example, emails and/or accounts which match the triggers, trigger information, data relating to any suspicious object in the emails, and contextual (smart or intelligent) alerts. The trigger information may include, for example, the triggered triggers of each relevant account and email. The suspicious object data may include, for example, the name and secure hash of an attachment or an embedded URL from the emails, and an account name. The contextual (smart or intelligent) alerts may include those alerts which involve the relevant account(s) or email(s).

FIG. 8 depicts a method of, and system 800 for, performing a complete root cause analysis (RCA) in accordance with an embodiment of the present invention. This "complete" root cause analysis utilizes the RCA scan task and advantageously performs further searching using other threat hunting platforms to generate further threat impact information.

As depicted, an RCA scan performed by the Messaging and Account Hunting Platform 210 may generate 81A a root cause account (for example, Account #A) and may also generate 81B an impact scope, which may include further accounts (for example, Account #B and Account #C). The root cause account information may be sent 82 automatically (by email, for example) to the SOC team 280 and also to a backend controller 815 of the backend system 810. The impact scope, along with information on suspicious objects, may be sent 83 automatically to other hunting platforms 230.

The other hunting platforms 230 may use the information (83) to further identify any undiscovered threats or adjust the malicious level of previously discovered suspicious threats. For example, the other hunting platforms 230 may search through stored data (such as logs and stored files, for example) of the accounts to detect threat-related files, threat-related URLs, and threat-related active directory (AD) accounts, for example.

The detected impact information 84 may be returned from the other hunting platforms 230 to the messaging and account hunting platform 210 and also to the backend controller 815. The messaging and account hunting platform 210 may use the detected impact information 84 as the search criteria for root cause analysis or impact scope determination. The backend controller 815 may analyze the detected information from the other hunting platforms 230, along with the root cause account information from the messaging and account hunting platform 210.

The analysis by the backend controller 815 may utilize a logic-based procedure and/or artificial intelligence to generate a "complete" (i.e. verified and elaborated upon) root cause analysis 85 which includes the account that distributed the attack and other accounts affected by the attack. The complete root cause analysis 85 may be sent from the backend controller 815 via an SOC tool 270 to the SOC team 280. The SOC team 280 may then use an SOC tool 270 to initiate mitigation and remediation tasks by sending out appropriate API commands.

FIG. 9 depicts a method of, and system 900 for, correlating anomaly discoveries in accordance with an embodiment of the present invention. The method and system advantageously utilize reference data to correlate different anomalies which may reported as a single incident.

As depicted, an anomaly discovery in the form of a contextual alert may be generated 91 by the Alert System 217 of the Messaging and Account Hunting Platform 210. The contextual alert may include information on a compromised source account and on further compromised accounts in an impact scope (for example, Compromised Account #A and Compromised Account #B). In addition to compromised accounts, the contextual alert may also include further information on emails found to be using sophisticated phishing techniques to conduct attacks. As depicted, notification of these compromised accounts and the further information may be provided by the Messaging and Account Hunting Platform 210 via an SOC tool 270 to the SOC team 280. In addition, the system 900 shown in FIG. 9 may send 92 information on the compromised accounts (and suspicious objects) and the further information to other threat hunting platforms 230.

The other threat hunting platforms 230 may perform searches to generate 93 reference information which may be sent to the Messaging and Account Hunting Platform 210 and also to the backend controller 815. In some cases, the backend controller 815 may use the reference information to correlate different anomaly discoveries so as to identify a single incident causing the anomalies. In such a case, the backend controller 815 may send notification to report 94 the incident via an SOC tool 270 to the SOC team 280. The SOC team 280 may then use an SOC tool 270 to initiate mitigation and remediation tasks by sending out appropriate API commands.

CONCLUSION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for threat hunting and response involving detection of anomalous messaging and discovery of compromised accounts, the system comprising:
   a messaging and account hunting platform, comprising at least one processor and memory, that receives account activities data and electronic mail message data via a data pipe;
   a triggering system in the messaging and account hunting platform, wherein the triggering system receives the account activities data and the electronic mail message data and determines which ones of a plurality of triggers are triggered;
   an alert system that receives triggered triggers, where said triggered triggers comprise those of said plurality of triggers which were triggered, and uses the triggered triggers to determine which ones of a plurality of contextual alerts are activated, wherein each contextual alert is activated when the triggered triggers satisfy a trigger-based rule, and wherein the trigger-based rule comprises a logical expression based on the plurality of triggers; and
   an action generator that receives a contextual alert and generates a security response depending upon the contextual alert,
   wherein the plurality of triggers comprises activity triggers which are triggered based on the account activities data,
   wherein the plurality of triggers further comprises content triggers which are triggered based on content in the electronic mail message data,
   wherein the plurality of triggers further comprises relationship triggers which are triggered based on a relationship between sender and receiver of an electronic mail message, and
   wherein the plurality of contextual alerts comprises an alert which is activated by a combination of activity and content triggers.

2. The system of claim 1 further comprising data storage for storing metadata relating to the account activities data and the electronic mail message data, wherein the triggering system retrieves the metadata from the data storage.

3. The system of claim 1, wherein the plurality of contextual alerts comprises an alert which is activated by a combination of activity and relationship triggers.

4. The system of claim 1, wherein the plurality of contextual alerts comprises an alert which is activated by a combination of multiple content triggers.

5. The system of claim 1, wherein the plurality of contextual alerts comprises an alert which is activated by a single trigger.

6. The system of claim 1, wherein the plurality of contextual alerts comprises an alert which is activated by a combination of activity, content and relationship triggers.

7. The system of claim 1, wherein the action generator comprises a security operations center (SOC) tool which is controlled by a SOC team.

8. The system of claim 1, wherein the action generator is implemented at a messaging security manager.

9. The system of claim 1, wherein application programming interface commands are used to communicate actions which are responsive to the contextual alerts.

10. The system of claim 9, wherein the application programming interface commands include search commands and a root cause analysis scan query.

11. The system of claim 10, wherein the application programming interface commands further include mitigation and/or remediation commands.

12. The system of claim 11, wherein the mitigation and/or remediation commands comprise blocking future attacks using metadata of a reported email message from the contextual alert.

13. The system of claim 11, wherein the mitigation and/or remediation commands comprise purging relevant electronic mail messages with metadata that is the same as corresponding metadata of a reported email message from the contextual alert.

14. The system of claim 11, the mitigation and/or remediation commands comprise enabling multi-factor authentication for a reported user account from the contextual alert.

15. The system of claim 11, the mitigation and/or remediation commands comprise disabling a reported user account from the contextual alert.

16. A system for threat hunting and response involving detection of anomalous messaging and discovery of compromised accounts, the system comprising:
  a messaging and account hunting platform, comprising at least one processor and memory, that receives account activities data and electronic mail message data via a data pipe;
  a triggering system in the messaging and account hunting platform, wherein the triggering system receives the account activities data and the electronic mail message data and determines which ones of a plurality of triggers are triggered;
  an alert system that receives triggered triggers, where said triggered triggers comprise those of said plurality of triggers which were triggered, and uses the triggered triggers to determine which ones of a plurality of contextual alerts are activated, wherein each contextual alert is activated when the triggered triggers satisfy a trigger-based rule, and wherein the trigger-based rule comprises a logical expression based on the plurality of triggers; and
  an action generator that receives a contextual alert and generates a security response depending upon the contextual alert,
  wherein said logical expression depends upon:
  a first activity trigger that indicates whether a sending domain of a message is new within a past predetermined time period;
  a second activity trigger that indicates whether an embedded universal resource locator (URL) is new within a recent time period, or low prevalence, or identified as malicious by a web reputation service;
  a third activity trigger that indicates that similar emails were received by multiple accounts; and
  one or both of first and second content triggers, each of said content triggers indicating that one or more keywords are contained in the embedded URL in a body of the message.

17. A system for threat hunting and response involving detection of anomalous messaging and discovery of compromised accounts, the system comprising:
  a messaging and account hunting platform, comprising at least one processor and memory, that receives account activities data and electronic mail message data via a data pipe;
  a triggering system in the messaging and account hunting platform, wherein the triggering system receives the account activities data and the electronic mail message data and determines which ones of a plurality of triggers are triggered;
  an alert system that receives triggered triggers, where said triggered triggers comprise those of said plurality of triggers which were triggered, and uses the triggered triggers to determine which ones of a plurality of contextual alerts are activated, wherein each contextual alert is activated when the triggered triggers satisfy a trigger-based rule, and wherein the trigger-based rule comprises a logical expression based on the plurality of triggers; and
  an action generator that receives a contextual alert and generates a security response depending upon the contextual alert,
  wherein said logical expression depends upon:
  a relationship trigger indicating that an attachment file type is new to a recipient within a past predetermined time period;
  one or both of second and third relationship triggers, wherein the second relationship trigger indicates that a first distance from a sender account to an external recipient exceeds a first predetermined threshold, and wherein the third relationship trigger indicates that a second distance from a sender account to an internal recipient exceeds a second predetermined threshold; and
  one or more of both first and second activity triggers, wherein the first activity trigger indicates whether a sending domain of a message is new within a past predetermined time period, and wherein the second activity trigger indicates whether an embedded universal resource locator (URL) is new within a recent time period, or low prevalence, or identified as malicious by a web reputation service.

18. A system for threat hunting and response involving detection of anomalous messaging and discovery of compromised accounts, the system comprising:
  a messaging and account hunting platform, comprising at least one processor and memory, that receives account activities data and electronic mail message data via a data pipe;
  a triggering system in the messaging and account hunting platform, wherein the triggering system receives the account activities data and the electronic mail message data and determines which ones of a plurality of triggers are triggered;
  an alert system that receives triggered triggers, where said triggered triggers comprise those of said plurality of triggers which were triggered, and uses the triggered triggers to determine which ones of a plurality of contextual alerts are activated, wherein each contextual alert is activated when the triggered triggers satisfy a trigger-based rule, and wherein the trigger-based rule comprises a logical expression based on the plurality of triggers; and an action generator that receives a contextual alert and generates a security response depending upon the contextual alert, wherein said logical expression depends upon:

one or both of first and second activity triggers, wherein the first activity trigger indicates whether an account has sent a number of messages surpassing a threshold in a recent time period, and wherein the second activity trigger indicates use of a BCC field in an email header and metadata which identifies content forwarding; and at least one trigger of a group of triggers comprising at least a third activity trigger, a first content trigger, and at least a first relationship trigger, wherein the third activity trigger depends on a logon timestamp and a logon IP address, wherein the first content trigger indicates that sent emails in a predetermined period of time contain local host information, and wherein the first relationship trigger indicates that a distance from a sender account to an external recipient exceeds a predetermined threshold.

19. A system for threat hunting and response involving detection of anomalous messaging and discovery of compromised accounts, the system comprising:

a messaging and account hunting platform, comprising at least one processor and memory, that receives account activities data and electronic mail message data via a data pipe;

a triggering system in the messaging and account hunting platform, wherein the triggering system receives the account activities data and the electronic mail message data and determines which ones of a plurality of triggers are triggered;

an alert system that receives triggered triggers, where said triggered triggers comprise those of said plurality of triggers which were triggered, and uses the triggered triggers to determine which ones of a plurality of contextual alerts are activated, wherein each contextual alert is activated when the triggered triggers satisfy a trigger-based rule, and wherein the trigger-based rule comprises a logical expression based on the plurality of triggers; and an action generator that receives a contextual alert and generates a security response depending upon the contextual alert, wherein said logical expression depends upon any two or more of multiple content triggers, said multiple content triggers comprising:

a first content trigger that indicates that content of a message does not match a writing style associated with an account;

a second content trigger that indicates that the content of the message has a new topic in a subject field a third content trigger that indicates that the message was sent at a time at which the account has never sent messages before; and a fourth content trigger that indicates that the content of the message has a writing style which is determined to be similar to that of a known attack email.

\* \* \* \* \*